(12) United States Patent
Smutzer et al.

(10) Patent No.: US 9,157,816 B2
(45) Date of Patent: Oct. 13, 2015

(54) TORQUE SENSOR

(71) Applicant: Tiax LLC, Lexington, MA (US)

(72) Inventors: Chad Austin Smutzer, Bedford, MA (US); J. Thomas Fowler, Marblehead, MA (US); Thomas Kotwal, Belmont, MA (US); Michael Rutberg, Somerville, MA (US); J. Robert Fricke, Woods Hole, MA (US)

(73) Assignee: TIAX LLC, Lexington, MA (US)

( * ) Notice: Subject to any disclaimer, the term of this patent is extended or adjusted under 35 U.S.C. 154(b) by 0 days.

(21) Appl. No.: 14/209,102

(22) Filed: Mar. 13, 2014

(65) Prior Publication Data

US 2014/0298922 A1 Oct. 9, 2014

Related U.S. Application Data

(60) Provisional application No. 61/779,724, filed on Mar. 13, 2013.

(51) Int. Cl.
*G01L 3/02* (2006.01)
*G01L 3/04* (2006.01)
*G01L 3/10* (2006.01)
*G01L 3/14* (2006.01)

(52) U.S. Cl.
CPC . *G01L 3/04* (2013.01); *G01L 3/109* (2013.01); *G01L 3/1428* (2013.01)

(58) Field of Classification Search
CPC ....... G01L 3/109; G01L 3/101; G01L 3/1435; G01L 3/1471; G01L 3/1428
USPC ............ 73/862.08, 862, 191, 862.325, 82.08, 73/862.191, 82.086
See application file for complete search history.

(56) References Cited

U.S. PATENT DOCUMENTS 4,357,662 A * 11/1982 Schira et al. ................... 701/111
4,590,806 A * 5/1986 Lutton et al. ............. 73/862.327

(Continued)

FOREIGN PATENT DOCUMENTS

EP 1386124 B1 5/2012
JP 5136232 B2 2/2013

(Continued)

OTHER PUBLICATIONS

International Search Report; International Application No. PCT/US2014/026051; International Filing Date: Mar. 13, 2014; Date of Mailing: Aug. 5, 2014; 8 pages.

(Continued)

*Primary Examiner* — Max Noori
(74) *Attorney, Agent, or Firm* — Cantor Colburn LLP (57) ABSTRACT

A torque sensing device includes a rotating component configured to rotate about an axis of rotation and a first sensor positioned adjacent to the rotating component to sense instantaneous angular position of the rotating component at a first location. A second sensor is positioned adjacent to the rotating component radially inboard of the first sensor to sense instantaneous angular position of the rotating component at a second location. A controller is operably coupled to the first sensor and the second sensor. The controller determines a relative phase shift between a first signal generated by the first sensor and a second signal generated by the second sensor to calculate an output proportional to a torque applied to the rotating component.

23 Claims, 6 Drawing Sheets

(56) References Cited

U.S. PATENT DOCUMENTS

| | | | |
|---|---|---|---|
| 4,656,990 A * | 4/1987 | Miyaki et al. | 123/494 |
| 6,158,132 A * | 12/2000 | Kofink et al. | 33/1 PT |
| 6,796,036 B1 * | 9/2004 | Klarer | 33/203 |
| 7,000,598 B2 * | 2/2006 | Sheikh et al. | 123/476 |
| 7,677,114 B2 * | 3/2010 | Deshmukh et al. | 73/862.328 |
| 7,726,208 B2 | 6/2010 | Hoeller et al. | |
| 7,800,359 B2 | 9/2010 | Goto et al. | |
| 7,812,600 B2 | 10/2010 | Ito et al. | |
| 7,841,231 B2 | 11/2010 | Kang et al. | |
| 8,130,115 B2 | 3/2012 | Kurumado et al. | |
| 8,203,332 B2 | 6/2012 | Guo et al. | |
| 8,226,525 B2 * | 7/2012 | Swales et al. | 477/3 |
| 8,326,570 B2 * | 12/2012 | Waite et al. | 702/151 |
| 8,400,143 B2 | 3/2013 | Kurumado et al. | |
| 8,436,724 B2 * | 5/2013 | Hannon | 340/445 |
| 8,620,543 B2 * | 12/2013 | Li et al. | 701/55 |
| 8,816,678 B2 | 8/2014 | Kitanaka et al. | |
| 2004/0187606 A1 | 9/2004 | Nehl et al. | |
| 2005/0173181 A1 * | 8/2005 | Masaki et al. | 180/400 |
| 2012/0293115 A1 | 11/2012 | Ramsesh | |
| 2012/0299586 A1 | 11/2012 | Martin et al. | |
| 2013/0019693 A1 | 1/2013 | Klimenko et al. | |
| 2013/0046486 A1 | 2/2013 | Pennell | |
| 2013/0113471 A1 | 5/2013 | Ura et al. | |
| 2013/0257419 A1 | 10/2013 | Greenwell et al. | |
| 2013/0270929 A1 | 10/2013 | Goodyear et al. | |
| 2013/0320970 A1 | 12/2013 | Foletto et al. | |
| 2014/0005976 A1 | 1/2014 | Platzer et al. | |

FOREIGN PATENT DOCUMENTS

| | | |
|---|---|---|
| JP | 2013024866 A | 2/2013 |
| JP | 2013096930 A | 5/2013 |
| JP | 5265362 B2 | 8/2013 |
| JP | 5333513 B2 | 11/2013 |
| WO | 2012162603 A1 | 11/2012 |
| WO | 2013184181 A2 | 12/2013 |

OTHER PUBLICATIONS

Meier, Bill et al., "Developments in Continuous Torque Monitoring Couplings," Presented at Ethylene Producers' Conference, Orlando, Florida, Apr. 26, 2006, 15 pages.

Written Opinion; International Application No. PCT/US2014/026051; International Filing Date: Mar. 13, 2014; Date of Mailing: Aug. 5, 2014; 6 pages.

* cited by examiner

TORQUE SENSOR

CROSS REFERENCE TO RELATED APPLICATIONS

This application claims priority to U.S. provisional application 61/779,724 filed Mar. 13, 2013, the entire contents of which are incorporated herein by reference.

BACKGROUND

This disclosure relates generally to automotive applications and, more particularly, to applications requiring high-resolution non-contact torque sensing.

Current engine sensing technology has no reliable, cost-effective, or direct means for measuring the torque output of an engine. The vehicle driver inputs a torque demand via the throttle pedal, and based upon this, fuel quantity and injection timing are looked up in a table that has been conservatively calibrated. The oxygen sensor provides an average feedback to the engine controller based on the multiple cylinders connected to the exhaust pipe. Based upon the fuel injection rate, injection timing, and the air/fuel ratio, the expected engine torque output may be calculated. The actual torque, however, may be different due to mixture preparation variation, unbalanced cylinders, or incomplete combustion.

High-resolution torque sensing will allow feedback of each cylinder's torque output, allowing the next cycle of combustion to be optimized on the fly leading to the maximum torque output of an engine. In addition, this direct feedback will improve fuel efficiency by allowing on-the-fly spark timing and fuel injection timing changes, as well as allow the engine controller to take advantage of the combustion properties of alternative and higher-octane fuels. Misfire detection, cylinder to cylinder balancing, drivability improvements, and individual cylinder tuning can be done with a direct feedback torque sensor to improve efficiency over the life of the engine.

SUMMARY

In one embodiment, a torque sensing device includes a rotating component configured to rotate about an axis of rotation and a first sensor positioned adjacent to the rotating component to sense instantaneous angular position of the rotating component at a first location. A second sensor is positioned adjacent to the rotating component radially inboard of the first sensor to sense instantaneous angular position of the rotating component at a second location. A controller is operably coupled to the first sensor and the second sensor. The controller determines a relative phase shift between a first signal generated by the first sensor and a second signal generated by the second sensor to calculate an output proportional to a torque applied to the rotating component.

Additionally or alternatively, in this or other embodiments the rotating component is in a path of torque transmission and exhibits an angular deflection as a result of the applied torque.

Additionally or alternatively, in this or other embodiments the first sensor is positioned at an outer periphery of the rotating component.

Additionally or alternatively, in this or other embodiments the rotating component includes a plurality of teeth disposed at the first location.

Additionally or alternatively, in this or other embodiments the first sensor detects passage of the plurality of teeth of the rotating component.

Additionally or alternatively, in this or other embodiments the second sensor is disposed at a reference wheel of the rotating component.

Additionally or alternatively, in this or other embodiments the reference wheel includes a plurality of reference teeth.

Additionally or alternatively, in this or other embodiments the second sensor detects passage of the plurality of reference teeth of the rotating component.

Additionally or alternatively, in this or other embodiments the controller uniquely identifies at least one tooth of the plurality of teeth and/or of the plurality of reference teeth upon each revolution of the rotating component.

Additionally or alternatively, in this or other embodiments the controller calculates a unique phase shift for each tooth of the plurality of teeth relative to the plurality of reference teeth.

Additionally or alternatively, in this or other embodiments the controller utilizes the tooth-specific phase shift to determine tooth-specific compensation values to correct for systemic variables.

Additionally or alternatively, in this or other embodiments at least one of the first sensor and the second sensor is a fluxgate sensor.

Additionally or alternatively, in this or other embodiments at least one of the first sensor and the second sensor is an inductive bridge sensor, an optical sensor such as an optical encoder, a laser-based sensor, a variable reluctance magnetic sensor, a magnetoresistance sensor, a Hall Effect sensor, or other suitable sensor configured to sense teeth.

Additionally or alternatively, in this or other embodiments the controller includes a field programmable gate array outputting a calculated torque value based on the first signal and the second signal.

In another embodiment, a method of determining a torque applied to a first rotating component includes sensing a first instantaneous angular position of a first portion of a rotating component via a first sensor disposed at the rotating component and sensing a second instantaneous angular position of a second portion of the rotating component via a second sensor disposed at the rotating component. A phase shift of the first instantaneous angular position relative to the second instantaneous angular position is calculated. A torque applied to the rotating component is calculated based on the phase shift.

Additionally or alternatively, in this or other embodiments the rotating component is in a path of torque transmission and exhibits an angular deflection as a result of the applied torque.

Additionally or alternatively, in this or other embodiments at least one of the first sensor and the second sensor is a fluxgate sensor.

Additionally or alternatively, in this or other embodiments at least one of the first sensor and the second sensor is an inductive bridge sensor, an optical sensor such as an optical encoder, a laser-based sensor, a variable reluctance magnetic sensor, a magnetoresistance sensor, Hall Effect sensor, or other suitable sensor configured to sense teeth.

Additionally or alternatively, in this or other embodiments the rotating component includes a plurality of teeth.

Additionally or alternatively, in this or other embodiments the second sensor is disposed at a reference wheel of the rotating component, the reference wheel including a plurality of reference teeth.

Additionally or alternatively, in this or other embodiments the second sensor detects passage of the plurality of reference teeth of the rotating component.

Additionally or alternatively, in this or other embodiments at least one tooth of the plurality of teeth and/or the plurality of reference teeth are uniquely identified upon each revolution of the rotating component.

Additionally or alternatively, in this or other embodiments the controller calculates a unique phase shift for each tooth of the plurality of teeth relative to the plurality of reference teeth.

Additionally or alternatively, in this or other embodiments the controller utilizes the tooth-specific phase shift to determine tooth-specific compensation values to correct for systemic variables.

These and other advantages, aspects, and features will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, aspects, and advantages are apparent from the following detailed description taken in conjunction with the accompanying drawings in which:

DETAILED DESCRIPTION

Figure 1:
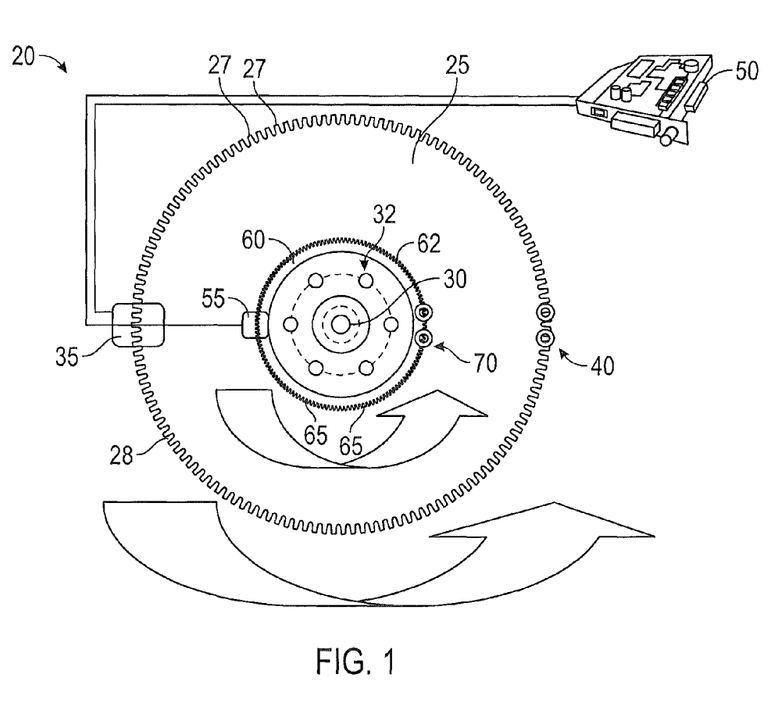
FIG. 1 is a front view of a torque sensing device according to an exemplary embodiment.

Referring to FIG. 1, a torque sensing device 20 according to one embodiment is shown. In the illustrated non-limiting embodiment, the torque sensing device 20 includes a flexplate 25 mounted to a shaft 30, such as with a plurality of bolts 32 for example, such that the flexplate 25 is configured to rotate about the axis of rotation of the shaft 30. In an embodiment, the flexplate 25 is a 135 tooth flexplate of an engine, and the shaft 30 coupled to the flexplate 25 is a crankshaft. A first sensor 35 is positioned about the outer periphery 28 of the flexplate 25. In an embodiment, at least one magnet 40 may optionally be similarly arranged adjacent the outer periphery 28 of the flexplate 25, or near the teeth 27 of the flexplate 25, such as opposite the first sensor 35 for example. At least one first magnet 40 may optionally be configured to dynamically magnetize the plurality of teeth 27 of the flexplate 25 to allow for detection of the teeth 27 by the first sensor 35. The first sensor 35 is operably coupled to a controller 50, such as an engine control unit for example.

In an embodiment, a second sensor 55 operably coupled to the controller 50 and configured to provide a calibrated reference signal is arranged near the center or inner hub of the flexplate 25. Alternatively, a reference wheel 60 having a second sensor 55 positioned about the outer periphery 62 thereof, the second sensor 55 being configured to communicate with the controller 50, may be similarly coupled to the shaft 30 in a coaxial orientation with the flexplate 25. The reference wheel 60 generally has the same number or fewer teeth 65 than the flexplate 25, such as a 60-2 tooth reference wheel 60 for example. The reference wheel 60 may include at least one second magnet 70 arranged adjacent the outer periphery 62 of the reference wheel 60, or near the teeth 65 of the reference wheel 60, such as opposite the second sensor 55 for example. The reference wheel 60 shows zero torsion either via its diameter, material stiffness, or attachment point. Though the illustrated embodiments magnetically detect the teeth 27, 65 of the flexplate 25 and the reference wheel 60, sensors 35, 55 configured to optically or inductively detect the teeth 27, 65 are within the scope of the disclosure. Exemplary first and second sensors 35, 55 include, but are not limited to, a fluxgate gradiometer, an inductive pickup, an inductive bridge, an optical sensor such as an optical encoder, a laser-based sensor, a variable reluctance magnetic sensor, a magnetoresistance sensor, Hall Effect sensor, or any other suitable sensor configured to sense teeth 27, 65. Through sensing of teeth 27, 65, rotation of and instantaneous angular position of the flexplate 25 and the reference wheel 60 may be determined.

The relative deflection between the flexplate 25 and the reference wheel 60, indicative of a difference in instantaneous angular position between the flexplate 25 and the reference wheel 60, or between the outer periphery 28 and the center of the flexplate 25 is proportional to the torque. The controller 50 includes a circuit 100 (see FIG. 2), which uses the first and second signals generated by the first sensor 35 and the second sensor 55 respectively to detect the phase shift between the first signal and the second signal, to create a high-resolution output proportional to the applied torque. In an embodiment, the flexplate 25 and/or the reference wheel 60 is formed from a substantially flat, non-toothed disk. Virtual teeth may be formed on the flexplate 25 and the reference wheel 60 using a magnet (not shown), such as an electromagnet for example. By providing an electrical or mechanical pulse to the magnet, the disk will rapidly magnetize and demagnetize such that the first and second sensor 35, 55 would detect the presence of teeth. These virtual teeth may be sensed by any of the magnetic sensing methods described herein. In another embodiment, teeth 27, 65 may be fabricated on a substantially flat, non-toothed disk, such as by arranging metal strips about the periphery of the disk. It is to be appreciated that while the flexplate 25 and the reference wheel 60 are separate components connected to each other via attachment, in some embodiments the flexplate 25 and the reference wheel 60 are portions of the same integral rotating component. For example, the flexplate 25 may be an outboard portion that flexes, while the reference wheel 60 is an inboard portion of the rotating component that does not flex, or flexes a relatively small amount, to provide a reference to measure the reference wheel 25 deflection.

Figure 2:
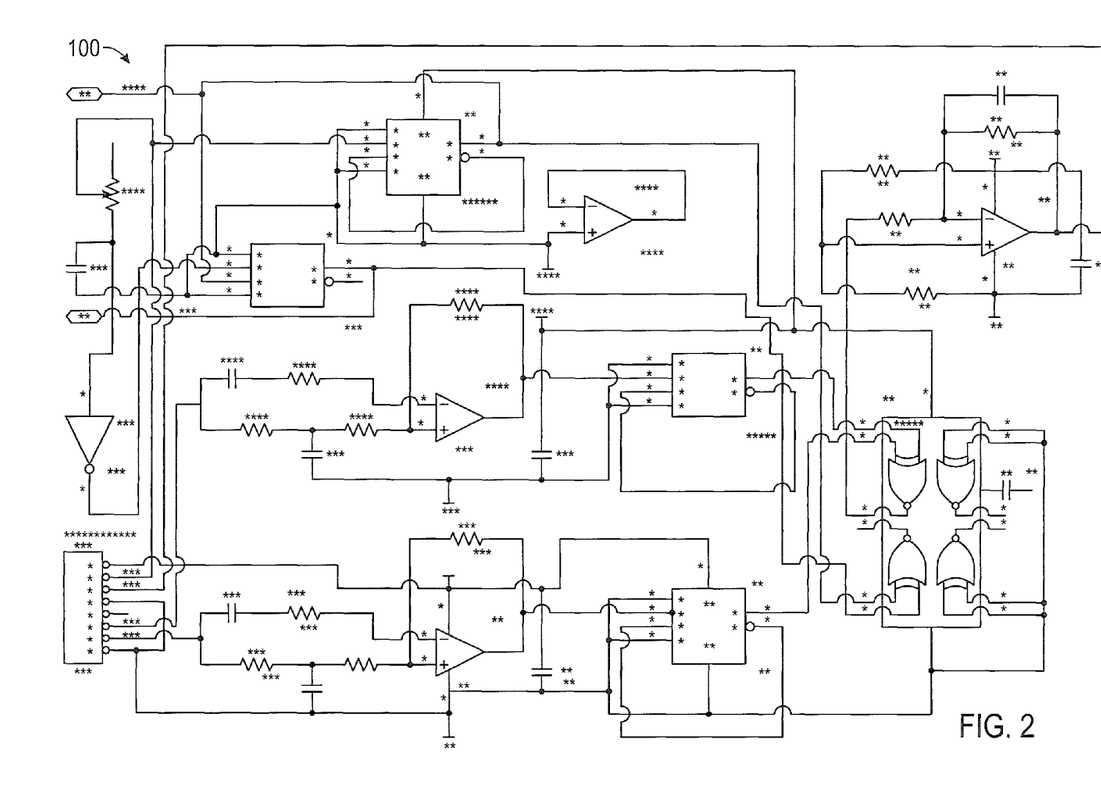
FIG. 2 is a schematic diagram of a circuit of a torque sensing device according to an embodiment.

The circuit 100 illustrated in FIG. 2, represents a detection and measurement system of the torque sensing device 20. In an embodiment, the circuit 100 is used to detect and interpret the signals from the first and second sensors 35, 55. Although a particular circuit configuration is illustrated and described in the disclosed non-limiting embodiment, other circuit configurations that perform the same function and produce an indicator of the relative phase between the first signal and the second signal are within the scope of the disclosure.

Figure 3:
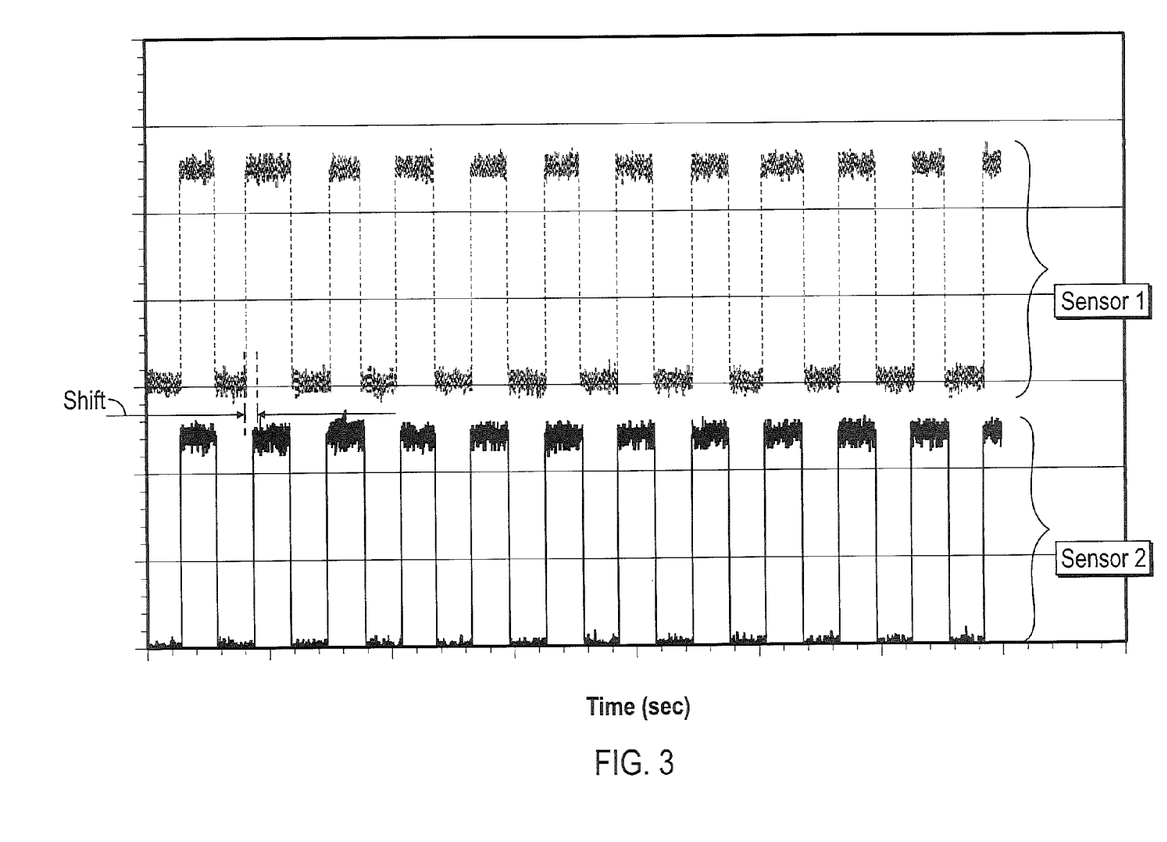
FIG. 3 is a schematic diagram of a first signal from a first sensor and a second signal from a second sensor of a torque sensing device according to an exemplary embodiment.

In embodiments including a flexplate 25 and a separate reference wheel 60, the torque is accurately measured by converting the number of teeth 65 on the reference wheel 60 such as with an algorithm for example, to the same number of teeth 27 as the flexplate 25. This algorithm for converting the number of teeth 65 on the reference wheel 60 includes measuring the toothed reference wheel 60, calculating a scaling factor to achieve the desired number of teeth, generating a pulsetrain that gives that number of teeth, and periodically anchoring the generated pulsetrain to the input signal to ensure an accurate tooth conversion. This algorithm generates a useful reference signal that allows comparison of the relative phasing of first signal from the first sensor 35 and the second signal from the second sensor 55, rendering a torque measurement. In an embodiment, the signals are physically offset in duty cycle such that the phasing can be easily measured as shown in FIG. 3.

In an embodiment, the algorithm may be configured to compensate for additional deformation as a result of the temperature of the flexplate 25. When the temperature is unknown, the algorithm may compensate using signal processing, because the deformation is a function of temperature and circumferentially periodic. This is a common mode signal that is fixed relative to the time scale of the torque measurements and can be estimated as a constant background signal underlying the time dependent torque signal. Once the deformation is determined, the temperature may be estimated such that the deformation effectively functions as a thermometer indicating the temperature of the flexplate 25. This would require an initial calibration but would be an additional signal that could be delivered.

The signals provided by the first and second sensors 35, 55 may further function as an absolute position encoder such that the stopping position of the shaft 30, and therefore the stopping position of an engine associated with the shaft 30, may be determined. The signals generated by the first sensor 35 and the second sensor 55 may be used to track the position of the teeth 27, 65 of the flexplate 25 and the reference wheel 60 as the engine stops. Another input signal, such as a cam sensor signal for example, would be used to determine the position of the flexplate 25 within the engine cycle. Conventional engines include two flexplate revolutions per engine cycle. Once calibrated, each tooth 27, 65 would be numbered and tracked as the engine stops, and this information would be provided to the controller 50 so that the absolute position of the crankshaft 30 would be known. This technique would provide information that would be useful, for example, for start-stop systems.

Figure 6:
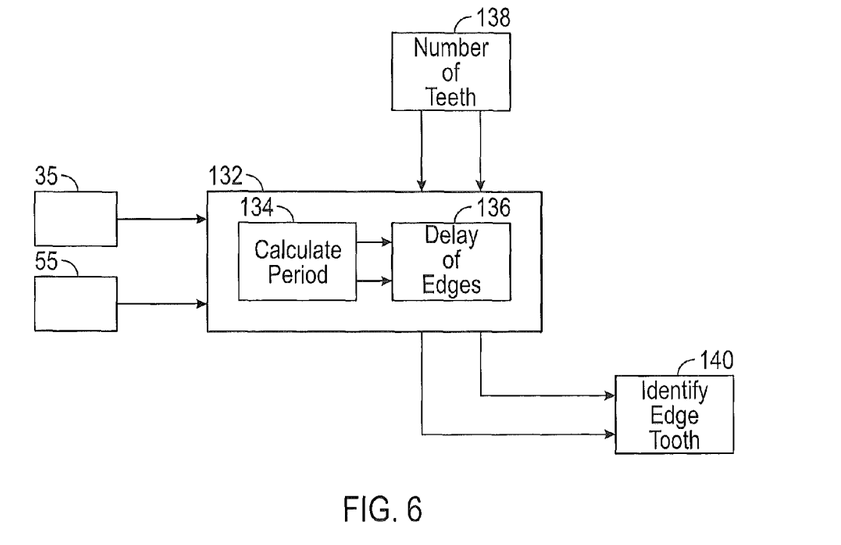
FIG. 6 is a schematic of illustration of an embodiment of a torque sensing device.

Referring now to FIG. 6, in an embodiment, phasing between the flexplate 25 and the reference wheel 60 is determined utilizing a set of digital functions programmed, for example, in a Field Programmable Gate Array (FPGA). Digitized versions of the signals from the first and second sensors 35, 55 are input directly into the FPGA, without converting one signal to the same number of teeth as the other signal. The FPGA precisely calculates a period of both the first and second signals and the delay between edges of the first and second signals using a high frequency clock, having a frequency about 200 MHz or higher, allowing for a measurement precision exceeding 5 nsec. The signals from the first and second sensors 35, 55 as well as information regarding the number of teeth 27, 65 in each of the flexplate 25 and the reference wheel 60, allow for an algorithm programmed into the FPGA to calculate phasing of the flexplate 25 and the reference wheel 60 with high temporal resolution. The FPGA can also identify each tooth 27, 65 on each revolution of the flexplate 25 and the reference wheel 60, making possible tooth-by-tooth calibration of the torque sensing device 20. The calibration is utilized to, for example, eliminate or reduce the effects of manufacturing variation or wear between the teeth 27, 65. The calibration may also be used to account for multi-revolution events, such as for a four stoke engine cycle requiring two revolutions per cycle.

Figure 7:
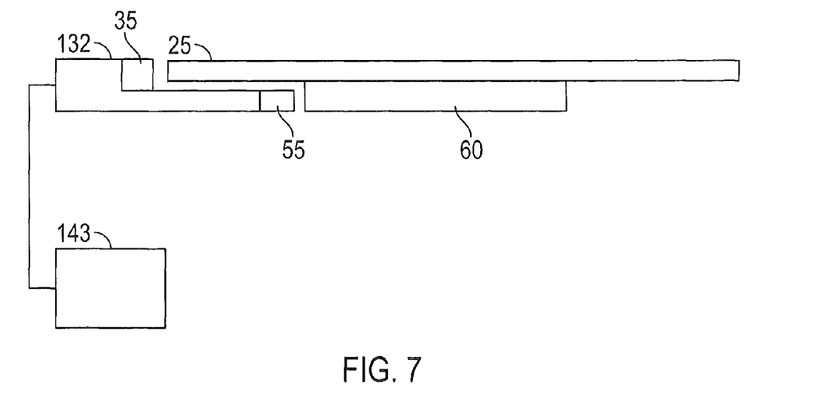
FIG. 7 is a schematic view of an embodiment of a torque sensing assembly.

In some embodiments, as shown in FIG. 7, the sensors 35, 35 are integrated into a package with the FPGA. The combined FPGA/sensor package outputs a torque value to, for example an engine control unit (ECU).

Figure 4:
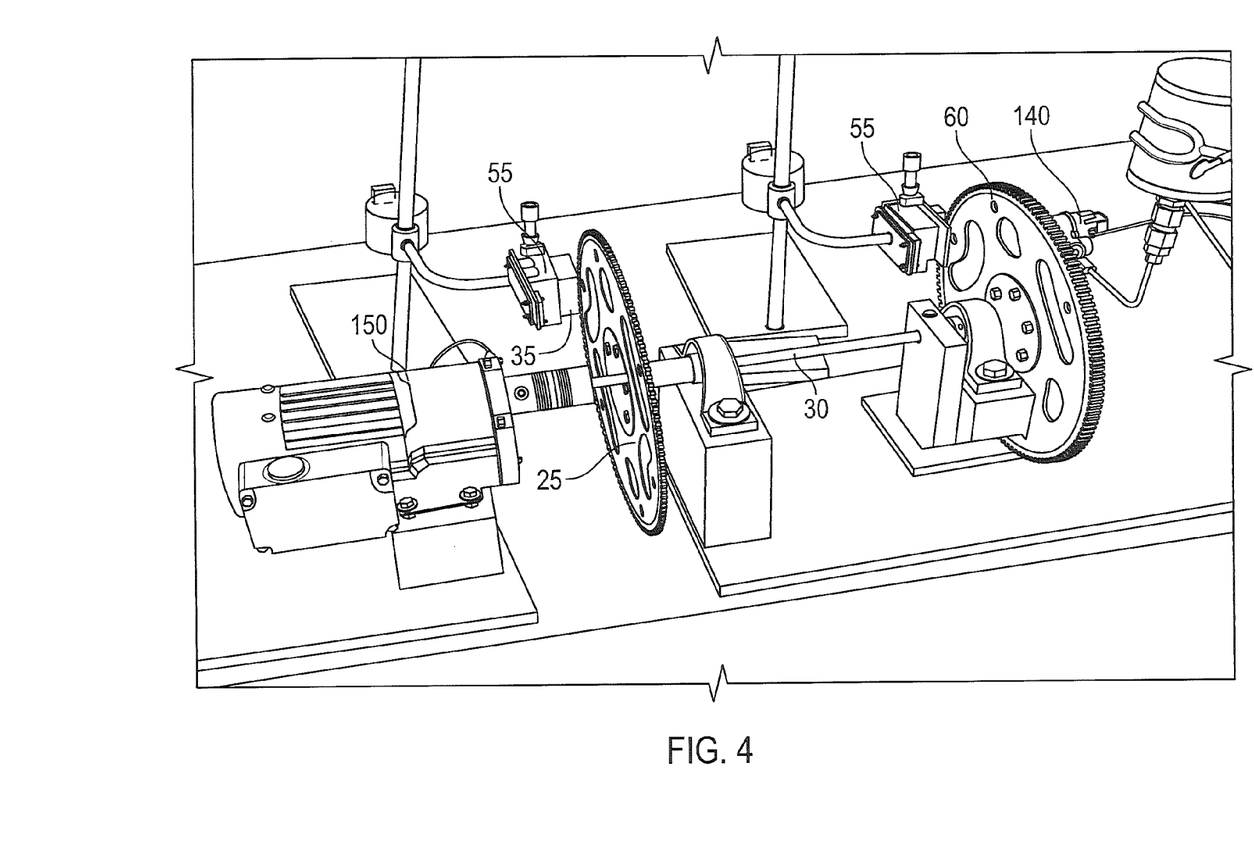
FIG. 4 is a perspective view of a bench test setup of a torque sensing device according to an embodiment.
Figure 5:
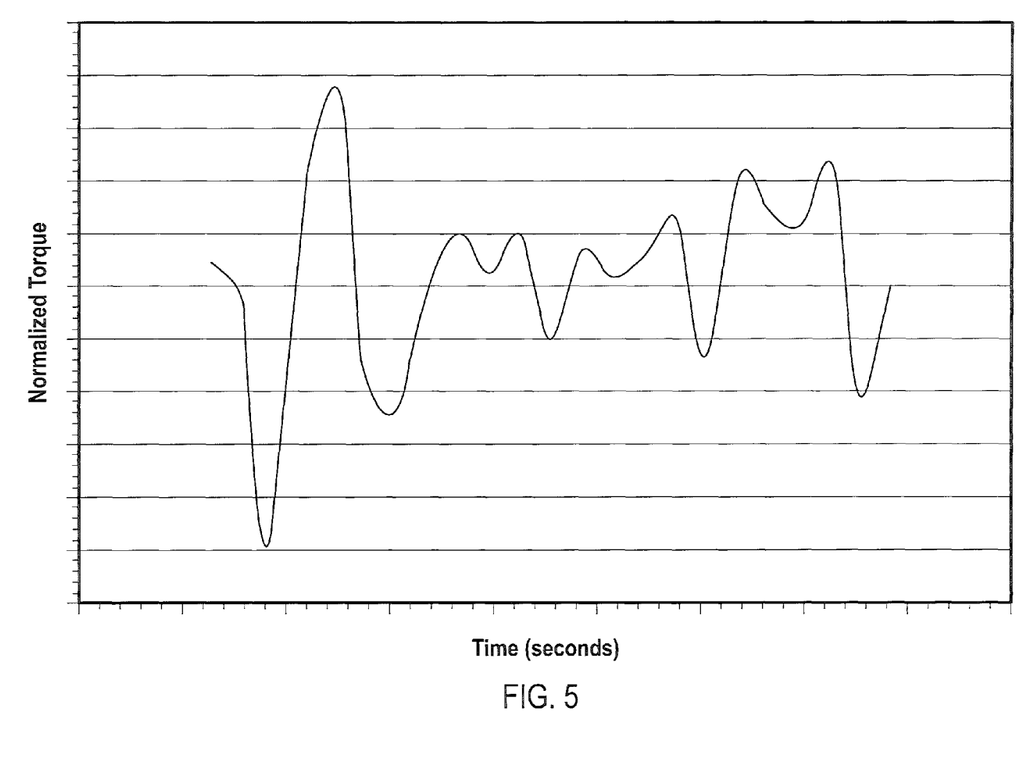
FIG. 5 is a schematic diagram of a torque measured using an embodiment of a torque sensing device.

Referring now to FIG. 4, the effectiveness of the torque sensing device 20 was tested in a rotating environment on a bench test stand. A small diameter shaft 30 was selected to have the equivalent deflection of the flexplate 25 on the engine, and the flexplate 25 was bolted to the shaft 30 via an adapter hub. In another embodiment, such as in an engine, the small diameter shaft may not be present and the flexplate may be adjacent to, e.g., disposed on, the reference wheel. A small hydraulic motor 140 provided drag force, causing the shaft 30 to twist. The torque sensor 35 was set up, and torque measured. The apparatus was rotated using a low speed gear motor 150 that turned at 30 Revolutions Per Minute (RPM). Results from this test setup are illustrated in FIG. 5, showing the capability of the torque sensing device 20 to measure transient torque events while the flexplate 25 rotates. The torque sensing device 20 is therefore configured to respond to torque fluctuations and detect negative torque events, such as during the compression stroke of a four stroke engine cycle for example. The magnetization of the flexplate 25 and/or reference wheel 60 may be optimized by adjusting the gap and location of the magnets 40, 70 relative to the teeth 27, 65, as well as by changing the strength of the magnets 40, 70. In an embodiment, the circuit 100 may include an automatic gain circuit that allows the maximum amount of magnetization without saturation of the circuit.

The torque sensing device 20 is generally intended for use in the automotive industry, particularly in vehicles equipped with automatic transmissions containing a flexplate and a torque convertor. However, potential applications of this sensing device 20 reach beyond the automotive industry to any application requiring high-resolution torque sensing, including but not limited to industrial processes, manufacturing, and automation. Inclusion of a torque sensing device 20 in an engine may result in an improvement in fuel economy, depending on the operating conditions and the fuel used. In addition, the torque sensing device 20 may allow for optimization of engine parameters to take full advantage of alternative fuel properties (i.e. octane number), thus improving the efficiency of the engine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A torque sensing device comprising:
    a rotating flexible disc configured to rotate about an axis of rotation, the rotating disc in a path of torque transmission and exhibiting am angular deformation as a result of a torque applied to the rotating flexible disc;
    a first sensor positioned adjacent to the rotating flexible disc to sense instantaneous angular position of the rotating flexible disc at a first radial location;
    a second sensor positioned adjacent to the rotating flexible disc radially inboard of the first sensor to sense instantaneous angular position of the rotating flexible disc at a second radial location;
    a controller operably coupled to the first sensor and the second sensor, wherein the controller determines a relative phase shift between a first signal generated by the first sensor and a second signal generated by the second sensor to calculate an output proportional to the torque applied to the rotating flexible disc.

2. The torque sensing device according to claim 1, wherein the flexible disc is a flexplate.

3. The torque sensing device according to claim 1, wherein the first sensor is positioned at an outer periphery of the rotating flexible disc.

4. The torque sensing device according to claim 1, wherein the rotating flexible disc includes a plurality of teeth disposed at the first radial location.

5. The torque sensing device according to claim 4, wherein the first sensor detects passage of the plurality of teeth of the rotating flexible disc.

6. The torque sensing device according to claim 4, wherein the second sensor is disposed at a reference wheel of the rotating flexible disc.

7. The torque sensing device according to claim 6, wherein the reference wheel includes a plurality of reference teeth.

8. The torque sensing device according to claim 7, wherein the second sensor detects passage of the plurality of reference teeth of the rotating flexible disc.

9. The torque sensing device according to claim 7, wherein the controller uniquely identifies at least one tooth of the plurality of teeth and/or of the plurality of reference teeth upon each revolution of the rotating flexible disc.

10. The torque sensing device according to claim 7, wherein the controller calculates a unique phase shift for each tooth of the plurality of teeth relative to the plurality of reference teeth.

11. The torque sensing device according to claim 10, wherein the controller utilizes the tooth-specific phase shift to determine tooth-specific compensation values to correct for systemic variables.

12. The torque sensing device according to claim 1, wherein at least one of the first sensor and the second sensor is a fluxgate sensor.

13. The torque sensing device according to claim 1, wherein at least one of the first sensor and the second sensor is an inductive bridge sensor, an optical sensor such as an optical encoder, a laser-based sensor, a variable reluctance magnetic sensor, a magnetoresistance sensor, or a Hall Effect sensor.

14. The torque sensing device according to claim 1, wherein the controller comprises a field programmable gate array outputting a calculated torque value based on the first signal and the second signal.

15. A method of determining a torque applied to a rotating flexible disc comprising:
  sensing a first instantaneous angular position of a first portion of a rotating flexible disc via a first sensor disposed at the rotating component, the rotating flexible disc in a path of torque transmission and exhibiting am angular deformation as a result of a torque applied to the rotating flexible disc;
  sensing a second instantaneous angular position of a second portion of the rotating flexible disc via a second sensor disposed at the rotating flexible disc;
  calculating a phase shift of the first instantaneous angular position relative to the second instantaneous angular position; and
  calculating the torque applied to the rotating flexible disc based on the phase shift.

16. The method according to claim 15, wherein at least one of the first sensor and the second sensor is a fluxgate sensor.

17. The method according to claim 15, wherein at least one of the first sensor and the second sensor is an inductive bridge sensor, an optical sensor such as an optical encoder, a laser-based sensor, a variable reluctance magnetic sensor, a magnetoreistance sensor, or a Hall Effect sensor.

18. The method according to claim 15, wherein the rotating flexible disc includes a plurality of teeth.

19. The method according to claim 18, wherein the second sensor is disposed at a reference wheel of the rotating flexible disc, the reference wheel including a plurality of reference teeth.

20. The method according to claim 19, wherein the second sensor detects passage of the plurality of reference teeth of the rotating flexible disc.

21. The method according to claim 20, further comprising uniquely identifying at least one tooth of the plurality of teeth and/or the plurality of reference teeth upon each revolution of the rotating flexible disc.

22. The method according to claim 20, wherein the controller calculates a unique phase shift for each tooth of the plurality of teeth relative to the plurality of reference teeth.

23. The method according to claim 22, wherein the controller utilizes the tooth-specific phase shift to determine tooth-specific compensation values to correct for systemic variables.

* * * * *